(12) United States Patent
Zhang et al.

(10) Patent No.: US 9,103,279 B2
(45) Date of Patent: Aug. 11, 2015

(54) MODEL BASED CONTROL TUNING PROCESS FOR GAS TURBINES

(71) Applicant: General Electric Company, Schenectady, NY (US)

(72) Inventors: Daili Zhang, Houston, TX (US); James Anthony West, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 13/666,580

(22) Filed: Nov. 1, 2012

(65) Prior Publication Data

US 2014/0121935 A1 May 1, 2014

(51) Int. Cl.
*G06F 19/00* (2011.01)
*G06G 7/70* (2006.01)
*F02C 9/00* (2006.01)

(52) U.S. Cl.
CPC .............. *F02C 9/00* (2013.01); *F05D 2270/71* (2013.01)

(58) Field of Classification Search
CPC ............................... F02C 9/28; F05D 2260/81
USPC ......................................................... 701/100
See application file for complete search history.

(56) References Cited

U.S. PATENT DOCUMENTS

| 3,731,070 | A | * | 5/1973 | Urban ........................... 701/100 |
| 3,956,883 | A | * | 5/1976 | Anderson et al. ............... 60/790 |
| 4,195,231 | A | * | 3/1980 | Reed et al. .................... 290/40 R |
| 4,201,923 | A | * | 5/1980 | Reed et al. .................... 290/40 R |
| 4,296,601 | A | * | 10/1981 | Martin ............................. 60/224 |
| 4,604,701 | A | * | 8/1986 | Fujawa et al. ................... 701/99 |
| 5,394,689 | A | * | 3/1995 | D'Onofrio ...................... 60/204 |
| 7,742,904 | B2 | * | 6/2010 | Healy et al. ....................... 703/7 |
| 7,822,512 | B2 | * | 10/2010 | Thatcher et al. .............. 700/287 |
| 7,904,282 | B2 | * | 3/2011 | Goebel et al. ..................... 703/7 |
| 8,452,515 | B2 | * | 5/2013 | Drohan et al. ................ 701/100 |
| 2007/0073525 | A1 | * | 3/2007 | Healy et al. ....................... 703/7 |

* cited by examiner

*Primary Examiner* — Behrang Badii
*Assistant Examiner* — Daniel L Greene
(74) *Attorney, Agent, or Firm* — Sutherland Asbill & Brennan LLP

(57) ABSTRACT

Systems and methods for model based control optimization for gas turbine systems. In one embodiment, a nonlinear optimization process with multiple nonlinear constraints create a set of control schedules that can work across an ambient range based on specific unit characteristics derived from a single test ambient. As part of model based control for a gas turbine system, all of the control schedules are defined based on a nominal unit. Multiple control loops are active across the ambient range with each control loop being active at a different ambient condition. This optimization process provides a set of control schedules to provide optimized performance for a specific gas turbine system or unit over a wide operation range.

18 Claims, 5 Drawing Sheets

MODEL BASED CONTROL TUNING PROCESS FOR GAS TURBINES

FIELD OF DISCLOSURE

This disclosure relates generally to gas turbines, and more specifically to model based control tuning for gas turbine systems.

BACKGROUND

Suppliers of gas turbine systems for power generation typically contractually guarantee certain performance conditions. That is, a contract between a supplier and a customer can specify certain performance conditions for a gas turbine system or unit to be provided to the customer. Computer models can be used to determine the performance conditions when bidding for a contract. The modeling can be typically set up to represent a nominal average gas turbine system or unit, but inevitably, there may be variations in a nominal average gas turbine system or unit and the system or unit that is ultimately installed because of hardware variations and measurement uncertainties and other circumstances. Accordingly, every gas turbine system or unit may not perform according to nominal performance modeling.

Once a gas turbine system or unit is installed, the supplier can perform an integrated tuning test and can collect data on the installed gas turbine system or unit. Using this data, the supplier may attempt to determine how different the gas turbine system or unit is performing from a nominal average gas turbine system or unit. An attempt can be made to tune the installed gas turbine control system or unit such that the performance conditions stated in a contract with the customer may be met.

One conventional control methodology used by a supplier to tune an installed gas turbine system or unit is called an exhaust temperature based control. In certain control systems, a control curve can be implemented with an exhaust temperature target versus compressor pressure ratio. Based on that curve shape, the firing temperature can be determined at ambient conditions. Adjusting the curve up or down can adjust the firing temperature and the gas turbine system or unit can operate at a new ambient condition. Similarly, the supplier may change the inlet guide vane (IGV) maximum open condition to adjust the amount of airflow the gas turbine system or unit will allow. However, the conventional control methodology described above only uses a single control loop across all ambient conditions so adjusting the performance settings at one set of test conditions can automatically affect the contract conditions as well. For a specific gas turbine system or unit deviating from the nominal performance conditions, nominal control schedules may not perform in a desired way. This variation may require the schedules to be updated, so the gas turbine system or unit can perform as intended at the contract performance conditions.

BRIEF DESCRIPTION OF THE DISCLOSURE

This disclosure relates to model based control tuning process for gas turbine systems. In one embodiment, a method for generating control schedules associated with a gas turbine can be provided. The method can include receiving at least one gas turbine operation limit; receiving at least one gas turbine operation condition; determining one or more gas turbine unit specific characteristics based at least in part on the at least one gas turbine operation condition; based at least in part on the one or more gas turbine unit specific characteristics and the at least one gas turbine operation limit, determining one or more control parameters corresponding to one or more temperatures; and based at least in part on the one or more control parameters, generating at least one control schedule or update an existing control schedule.

In another embodiment, a system for generating control schedules associated with a gas turbine can be provided. The system can include a gas turbine and at least one processor. The at least one processor can be configured to: receive at least one gas turbine operation limit; receive at least one gas turbine operation condition; determine one or more gas turbine unit specific characteristics based at least in part on the at least one gas turbine operation condition; based at least in part on the one or more gas turbine unit specific characteristics and the at least one gas turbine operation limit, determine one or more control parameters corresponding to one or more temperatures; and based at least in part on the one or more control parameters, generate at least one control schedule or update an existing control schedule.

In yet another embodiment, one or more computer-readable media storing computer-executable instructions can be provided. The computer-executable instructions, when executed by at least one processor, can configure the at least one processor to: receive at least one unit specific characteristic associated with the gas turbine engine; receive at least one control limit associated with the gas turbine engine; receive at least one set of ambient operating conditions; determine a value of at least one controllable input to the gas turbine engine operable to minimize a difference between a unit specific output of the gas turbine engine and a predefined lower output limit of the gas turbine engine and a difference between a unit specific heat rate of the gas turbine engine and a predefined upper heat rate limit of the gas turbine engine, wherein the unit specific output and the unit specific heat rate of the gas turbine engine are each functions of the at least one unit specific characteristic, the at least one control limit and the at least one set of ambient operating conditions; and generate at least one control schedule based on the determination.

Other embodiments and aspects will become apparent from the following description taken in conjunction with the following drawings.

BRIEF DESCRIPTION OF THE DRAWINGS

The following drawings illustrate certain implementations as described herein.

Figure 1:
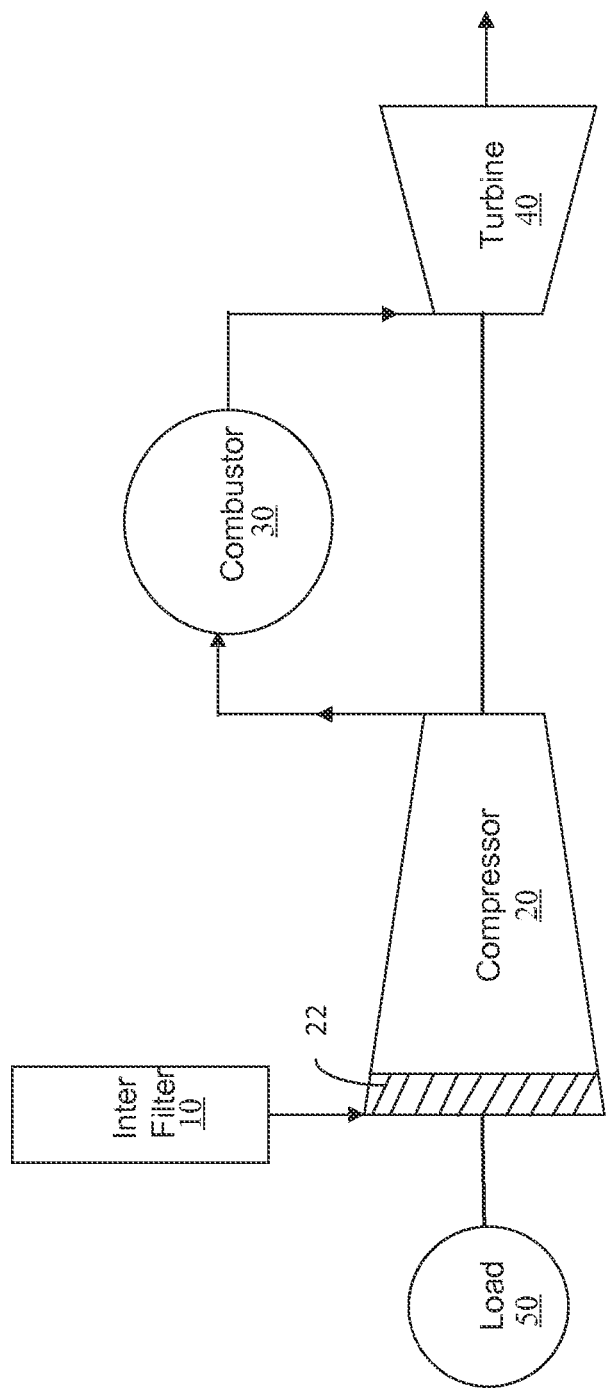
FIG. 1 illustrates a functional block diagram of a representative embodiment of a nominal gas turbine system constructed in accordance with an embodiment of the disclosure.

These implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION OF THE DISCLOSURE

Embodiments of the disclosure can provide model based control tuning process for gas turbine units. Certain embodiments can use a nonlinear optimization process with multiple nonlinear constraints to create a set of new control schedules that can work across an ambient range based on specific gas turbine system or unit characteristics derived from a single test ambient. As part of model based control (MBC) for a gas turbine, some or all of the control schedules can be defined based on a nominal gas turbine system or unit. Multiple control loops may be active across the ambient range with each control loop being active at a different ambient condition. This tuning process can provide a set of control schedules operable to provide improved performance for a specific gas turbine system or unit over a wide operation range, which can be at least one technical effect of the disclosure. The process may be used in the integrated tuning process for a gas turbine system or unit to ensure compliance with desired performance parameters.

In certain embodiments, a new set of control schedules can be provided to improve performance for a specific gas turbine system or unit over a wide operation range. A method, according to at least one embodiment, can include obtaining the operation limits and operation conditions. Field test data can be collected and data reduction can be used to obtain gas turbine system or unit specific characteristics. A thermodynamic model that represents the gas turbine system or unit specific characteristics can be used to run the tuning process for a set of ambient temperatures. The results can then be organized from the tuning process to update the control schedules.

Certain systems and methods according to embodiments of the disclosure may create a set of new control schedules based on gas turbine system or unit specific characteristics with respect to all of the boundary conditions/operation limits over a wide operation range. Two sets of inputs for the process can be distinguished. One set may be non-controllable inputs, which can include certain gas turbine system or unit operation conditions, operation limits and unit characteristics (e.g., inlet pressure drop, exhaust pressure drop, compressor flow and efficiency, turbine efficiency and stage 1 nozzle flow coefficient, combustor efficiency, etc.). The other set of inputs may be controllable inputs, which can include certain control variables (e.g., IGV angle, $T_{fire}$ (firing temperature), etc). Thus, certain embodiments of the disclosure can seek the better control schedules for a specific gas turbine system or unit based on the non-controllable inputs with respect to some or all boundary conditions to minimize any penalty function, which can be at least one technical effect of the disclosure.

Referring to FIG. 1 of the drawings, there is shown a functional block diagram of an example nominal gas turbine system in accordance with an embodiment of the disclosure. In the illustrated embodiment, the gas turbine system 100 or unit can include a gas turbine 40 which may drive a load 50. An inlet filter 10 can remove foreign objects and debris from the air stream. The compressor 20 can compress the incoming air to high pressure. Air can enter the compressor 20 by way of a variable inlet guide vane mechanism 22 which can control the degree of opening of the turbine air intake and is used to adjust the amount of airflow the turbine 40 will allow. The combustor 30 can mix the air with fuel and can burn the fuel to produce high-pressure, high-velocity gas. Limiting the fuel flow to the gas turbine may help to maintain the internal operating temperatures. The firing temperature may be adjusted based on how much fuel is provided in the mixture. The highest temperature in the gas turbine can occur in the flame zone of the combustion chambers 30. The combustion gas in that zone can be diluted by cooling air and flows into the turbine section 40. The temperature of that gas is known as the "firing temperature" of the gas turbine. The hot combustion gas can flow across the turbine 40 causing it to rotate converting the energy from the hot gas into mechanical energy. This mechanical energy may be used to drive a load 50, with a generator for producing electricity, or with other systems for other applications that are well known in the art.

Figure 2:
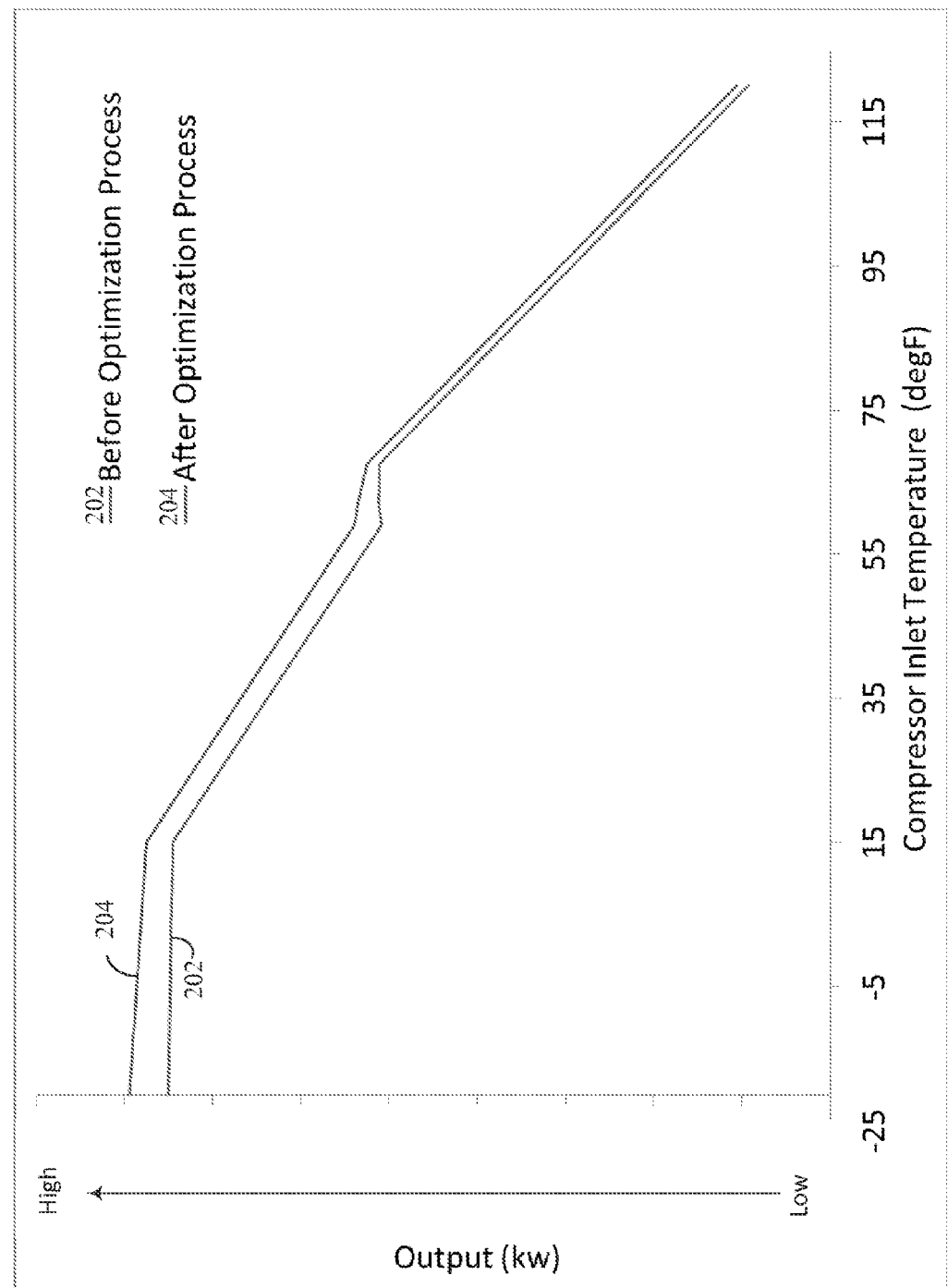
FIG. 2 illustrates a graphical representation comparison of a gas turbine output improved with model based control tuning in accordance with an embodiment of the disclosure.
Figure 3:
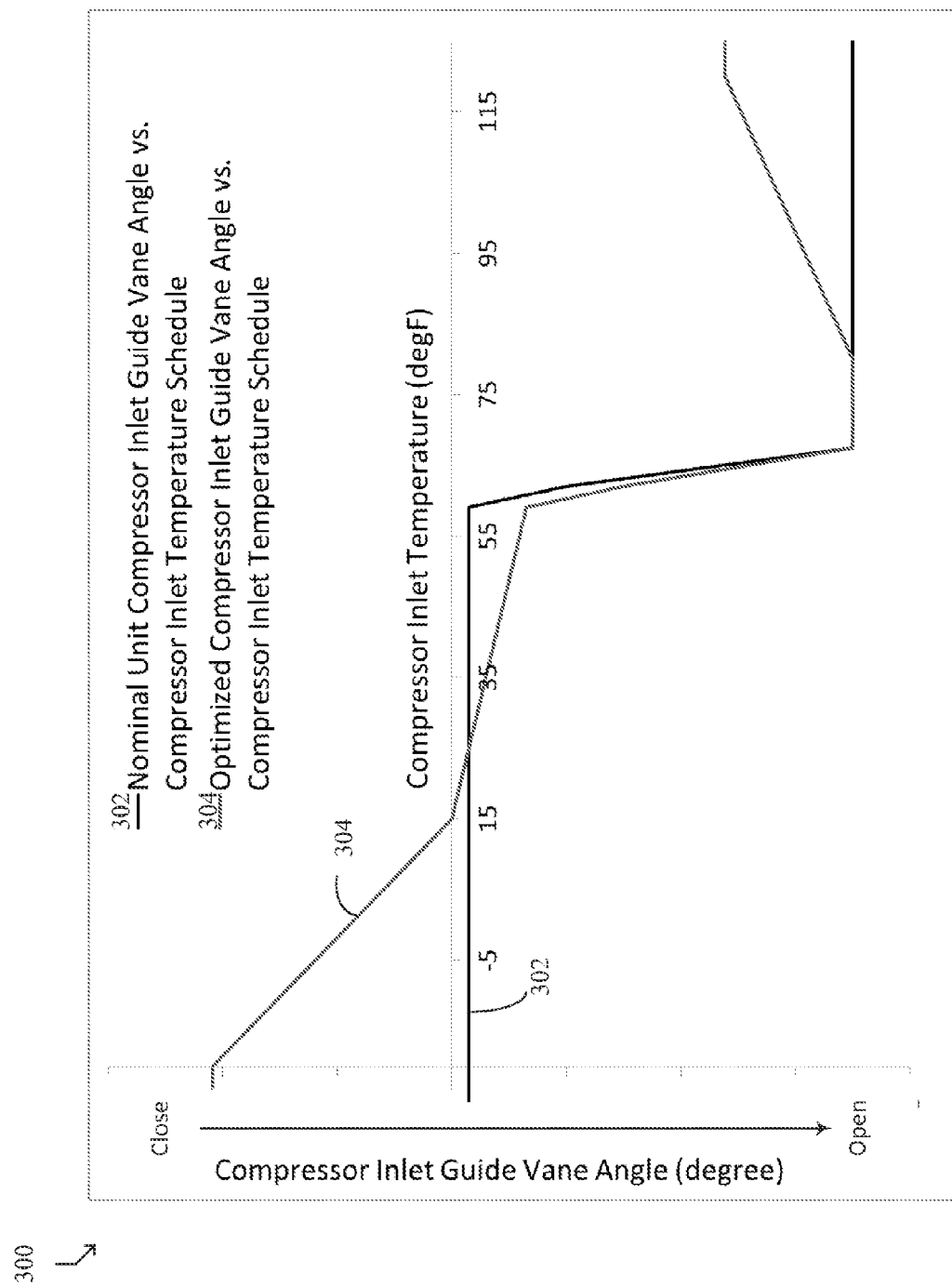
FIG. 3 illustrates a graphical representation comparison of a gas turbine control schedule improvement with model based control tuning in accordance with an embodiment of the disclosure.

FIG. 2 illustrates a graphical representation comparison 200 of a gas turbine system or unit performance output with model based control tuning in accordance with an embodiment of the disclosure. For a specific unit, the model-based control tuning process can improve the unit performance across a wide range of ambient conditions. A first line 202 illustrates a gas turbine system or unit output performance prior to the tuning process. The pre-process output of the unit in kilowatts (kws) before tuning across a range of expected compressor inlet temperatures is shown as the "before" line 202. A second line 204 illustrates a gas turbine system or unit performance after the tuning process. In this example, the unit operates with a higher output after the model base control tuning process as shown by the "after" tuning line 204. In this example, the post process or tuned unit operates with a higher output (kws) than the pre-process unit across the range of compressor inlet temperatures. FIG. 3 illustrates a graphical representation comparison 300 of a gas turbine system or unit control schedule with model based control tuning in accordance with an embodiment of the disclosure. A first line 302 illustrates a gas turbine system or unit compressor inlet guide vane (IGV) angle vs. compressor inlet temperature control schedule prior to the tuning process. A second line 304 illustrates a gas turbine system or unit compressor inlet guide vane (IGV) angle vs. compressor inlet temperature control schedule after the tuning process.

Turning now to FIG. 2, unit specific variation may require operating schedules to be updated, so the unit can meet or perform closer to a nominal unit at the contract specified performance conditions. Using model based control with the tuning process instead of using a basic operating curve can provide for greater performance for a specific gas turbine unit over a wide operation range as shown by the post-process line 204.

Rather than using a relatively simplistic control scheme, the model based control can run or otherwise operate in real time. The model based control can allow running a plurality of limits instead of one operating curve that has to represent or otherwise protect the gas turbine system or unit against all of its limits. By way of example, the model based control may run multiple limits and may provide a curve for protecting exhaust temperature, another for protecting firing temperature, another for protecting the velocity of air coming out the back of the turbine, which can be referred to as the turbine exit axial Mach number.

In one example implementation of a model in accordance with an embodiment of the disclosure, data can be collected on a 50 degree Fahrenheit (F) day and may show what may be done to ensure the gas turbine system or unit meets certain contract requirements on an 80 degree Fahrenheit (F) day which may be specified as a contract condition. Data may be collected for the gas turbine system or unit on the 50 degree Fahrenheit (F) test day and from this data, the model can calculate how the installed gas turbine system or unit varies from a nominal gas turbine system or unit.

To ensure compliance with certain contract obligation conditions, the gas turbine system or unit may need certain performance tuning. For instance, air flow may be changed by altering the IGV settings on an inlet of the compressor or the firing temperature set point may be changed. The model may use these two and other adjustable variables to tune the gas turbine system or unit in such a manner that it will meet or become closer to the desired contract performance criteria. The output from the model can show whether the gas turbine system or unit will be performing higher or lower than expectation at the desired contract performance criteria.

On the day of testing for the gas turbine system or unit, various parameters can be collected. However, the desired contract performance may be at different specified conditions, which may have been negotiated before the contract was executed. For example, the data may be collected on a 50 degree day Fahrenheit (F) ambient temperature at a certain humidity level, but the contract specified performance may be for an 80 degree Fahrenheit (F) day and some other predefined humidity level. Modeling of the gas turbine system or unit based on the test data may determine whether to overfire the gas turbine system or unit or underfire it, or may determine what other changes may be made to the gas turbine system or unit so that it can meet the contract specified performance for an 80 degree Fahrenheit (F) day.

In addition, the model based control can include controls to ensure operational limits are not exceeded. For example, a contract condition may specify 80 degrees Fahrenheit (F) ambient, but there may also be limits on how the gas turbine system or unit may operate. In the same example, on a relatively cold day, such as a 30 degree Fahrenheit (F) day, a limit on the turbine exit axial Mach number should not be exceeded. If the airflow is too high coming out of the back of the gas turbine system or unit, durability problems may occur in the last stage bucket. The model may start to close the IGVs down and limit the amount of airflow going into the gas turbine system or unit. Thus, with the same data that may have been collected at the 50 degree Fahrenheit (F) ambient, the model may be calibrated to account for the airflow of the gas turbine system or unit at relatively lower ambient temperatures. The target airflow may be adjusted such that the model can bring the air flow down to ensure the gas turbine system or unit does not exceed that limit or is increased to provide more power if the gas turbine system or unit is on or below that limit.

FIG. 3 illustrates a graphical representation of a gas turbine system with model based control tuning in accordance with an embodiment of the disclosure. The process creates a set of new control schedules based on unit specific characteristics with respect to all of the boundary conditions/operation limits over a wide operation range.

As illustrated in FIG. 3, a nominal unit's operating schedule 302 is shown for the compressor inlet guide vane angle (in degrees) across a range of compressor inlet temperatures (in degrees Fahrenheit). However, inherent differences in an actual built unit and a nominal unit may cause the actual unit to have different operational characteristics. For a specific unit deviating from the nominal characteristics, the nominal control schedules may not perform in a desired way. Accordingly, a nonlinear optimization process with multiple nonlinear constraints may create a set of control schedules that provide improved performance across the ambient range based on specific unit characteristics. For example, as shown is an improved control schedule 304 for compressor inlet guide vane angle (in degrees) across the same range of compressor inlet temperatures (in degrees Fahrenheit). As illustrated, the different unit specific characteristics may cause the operating schedule 304 to differ from the nominal schedule 302.

In model based control (MBC) units, a specific gas turbine system or unit may have different constraints at different operating conditions. At one operating condition, adjusting either $T_{fire}$ or IGV, or both, may not guarantee to improve the performance at other operating conditions (that is the current integrated tuning process). At a relatively low ambient temperature, the gas turbine system or unit may reach a $T_{rise}$ (temperature rise) maximum limit and turbine exit axial Mach number limit. If the gas turbine system or unit was tested at standard conditions used by the gas turbine industry (e.g., ISO conditions of about 59 degrees Fahrenheit (F), about 14.7 psia, and about 60% relative humidity), moving $T_{fire}$ and IGV to meet the performance guarantees at the ISO conditions may not improve the gas turbine system or unit performance at relatively low ambient temperature. At a relatively high ambient temperature, the gas turbine system or unit may reach the corrected speed maximum limit. If the gas turbine system or unit was tested at ISO conditions, moving the IGV to meet the performance guarantees at ISO conditions may not improve the gas turbine system or unit performance at relatively high ambient temperatures. Thus, using an integrated tuning process for MBC gas turbine systems or units facilitates tuning the gas turbine systems or units across the whole operating range instead of one point with respect to all of the constraints at different operating conditions.

A MBC system and process according to certain embodiments of the disclosure can use the following equations to tune the gas turbine system or unit across a range of ambients:

$$O_d(X_n, X_c, T) = y_1(X_n, X_c, T) - y_{1LSL}(T)$$

$$H_d(X_n, X_c, T) = y_{2USL}(X_n, X_c, T) - y_2(X_n, X_c, T)$$

$$\text{Objective1} = k_1 O_d(X_n, X_c, T) + k_2 H_d(X_n, X_c, T)$$

$$\text{Objective2} = \text{if}(O_d < 0, k_1, 0) * O_d(X_n, X_c, T) + \text{if}(H_d < 0, k_2, 0) * (H_d(X_n, X_c, T))$$

where the variables are defined:
$O_d$: Output difference
$H_d$: Heat rate difference
$y_1$: Output
$y_2$: Heat Rate
$y_{1LSL}$: Output Lower Specification Limit
$y_{2USL}$: Heat Rate Upper Specification Limit
$k_1$: Output Weighting Factor
$k_2$: Heat Rate Weighting Factor Input Variable Set 1(Non-controllable: Hardware and Operating Conditions): $X_n = [DMM_{CompEff}, DMM_{CompFlow}, DMM_{CombEff}, DMM_{TurbEff}, DMM_{TurbCq}, Dp_{Inlet}, Dp_{Exh}, RH, T]$ Input Variable Set 2(Controllable: $T_{fire}$ and IGV): $X_c = [T_f, IGV]$ The tuning process may create a new set of control schedules to provide improved performance for a specific gas turbine unit over a wide operation range. Field test data can be collected and data reduction can be used to obtain gas turbine system or unit specific characteristics. A thermodynamic model that represents the gas turbine system or unit specific characteristics can be used to run the tuning process for a set of ambient temperatures. The results can be organized from the tuning process to update the control schedules.

Two sets of inputs for the system and process can be distinguished. One set is called non-controllable inputs which can include, for example, the unit operation conditions, operation limits and unit characteristics (inlet pressure drop, exhaust pressure drop, compressor flow and efficiency, turbine efficiency and stage 1 nozzle flow coefficient, combustor efficiency, etc.). The other set is called controllable inputs, which can include, for example, the control variables (IGV angle, $T_{fire}$, etc). The tuning process can seek better control schedules for a specific gas turbine system unit based on all of the non-controllable inputs with respect to all boundary conditions to minimize any penalty function.

For example, the data matching step may compare data on the field test day on a 50 degree Fahrenheit (F) day and the model on a 50 degree Fahrenheit (F) day. Inherent differences in the actual built and a nominal unit may cause a delta. The actual gas turbine data can be reduced to the data matched from a nominal model. Data reduction can correlate how the gas turbine system or unit actually works in the field to a nominal gas turbine system or unit and the derived parameters that are input into the model.

The data match process can collect field data on the 50 degree Fahrenheit (F) day, in the above example. A determination can be made on how different the air flow is from the nominal model. This difference can create a compressor flow multiplier which is a data match multiplier. The pressure and temperature rise may have been measured from which a compressor efficiency multiplier may be determined. Also collected may have been data to determine a multiplier on turbine efficiency. Turbine efficiency may be determined from the fuel flow entering the system, the exhaust temperature and the pressure ratio across the turbine. In addition, a turbine flow coefficient may be determined. The parameter can be the flow coefficient of the first stage nozzle or how easily flow can get through the first stage nozzle. The turbine flow coefficient can set the pressure ratio of the engine. These 5 data match multipliers may be added to the model to create a match on the outputs collected at the test conditions. On the test day, there can also be an inlet pressure difference, an exhaust pressure difference, relative humidity, and a temperature at which the test data was collected. The $Dp_{Inlet}$ can be a difference between the ambient pressure to the compressor inlet pressure. The $Dp_{Exh}$ can be a difference between the gas turbine exhaust pressure and the ambient pressure. RH can be the relative humidity and T can be the ambient temperature. The data multipliers representing the deviations of the specific unit from a nominal unit can be reduced to correlate the model to the actual gas turbine system or unit based upon the test data collected at the test conditions in the field on the test day.

These collected data may be used to create the input variable set 1, $X_n$, which are the non-controllable variables consisting of the hardware and operating conditions. Accordingly, X, can model the turbine characteristics. It is a measure of the component efficiencies and is composite of all the efficiency multipliers. The determined reduction can be input into the model and adjusted to capture the real characteristics of the gas turbine system or unit. After the data reduction, the outputs from the model can match the field data collected. For example, once the data collected on the 50 degree Fahrenheit (F) day has been matched to the model to determine the data match multipliers, the model may be ran for an 80 degree Fahrenheit (F) day, or 30 degree Fahrenheit (F) day, or any other ambient condition.

Ideally, the output of the actual unit can meet or exceed the contract specified output at the conditions stated in the contract, and heat input can meet or be below a heat input upper limit specified in the contract. Accordingly, a goal is to minimize Objective1 subject to any operational limits. This objective may be represented as follows:

$$\text{Minimize } k_1 O_d(X_n, X_c, T) + k_2 H_d(X_n, X_c, T) \text{ subject to:}$$
$$y_1(X_n, X_c, T) \leq y_{1USL}; M_x(X_n, X_c, T) \leq M_{xUSL}; T_{Rise}(X_n, X_c, T) \leq T_{RiseUSL}; T_{Exh}(X_n, X_c, T) \leq T_{ExhUSL} \text{ and}$$
$$O_d(X_n, X_c, T) \geq 0; H_d(X_n, X_c, T) \geq 0 \text{ by changing } X_c = [T_f, \text{IGV}]$$

where $T_f \leq T_{fUSL}$, $\text{IGV} \geq \text{IGV}_{LSL}(T)$ $M_x$: Turbine Exit Axial Mach Number
$T_{Rise}$: Combustor Temperature Rise
$T_{Exh}$: Turbine Exhaust temperature $O_d$ can be the difference between the actual output on the gas turbine from the contract output lower specification limit. $H_d$ can be the difference between the contract upper specification limit and the actual heat rate of the gas turbine system or unit. The heat rate may be expressed in terms of energy consumed divided by the output produced. Control variables, X, may be adjusted to minimize the difference from the nominal conditions.

Adjustment may be needed to meet the contract specified targets. After the step of data match reductions, the operating control schedules may need to be modified. A schedule is a set of inputs, such as firing temperature and IGV angles that are used to achieve the target. The control methodology can be based on the exhaust temperature as a function of compressor pressure ratio. The process attempts to find the correct control schedules to minimize any differences from the contract conditions. The schedules may drive the gas turbine system or unit to different conditions.

The tuning process can create a new set of control schedules to provide improved performance for a specific gas turbine system or unit over a wide operation range. Thermodynamic models can be used to run the tuning process for a set of ambient temperatures. For example, the firing temperature is a controllable variable. Increasing the firing temperatures can increase the gas turbine system or unit output. However, increasing the firing temperature may cause the heat rate upper limit to be exceeded. In addition, the inlet guide vane mechanism may be used to adjust the amount of airflow the gas turbine system or unit will allow. Increasing the mass flow can also increase the gas turbine or unit output. However, increasing the airflow may cause the turbine exit axial Mach number to be exceeded. The control system may generate curves based on exhaust temperature target versus compressor pressure ratio at different ambients. During the tuning process, the firing temperature may be adjusted or the IGV vanes may be adjusted to improve the solution. The schedules can show how a specific gas turbine system or unit will function at different ambient conditions, at different target firing levels, and different IGV settings. Accordingly, combined input variable set 2, $X_c$, can be used to generate the new control schedules.

However, limitations may exist on the amount of control the variables may produce. For example, the heat rate upper specification limit may be specified in the contract. Accordingly, temperature rise, $T_{Rise}$, may have an upper spec limit. Additionally, there can be other temperature limits. For example, excessive temperature may burn up or cause excessive wear on certain hot gas path components. The temperature limitation, $T_{ExhUSL}$, may represent a different upper specification limit. Likewise, exceeding the turbine exit axial mach limit $M_{xUSL}$, can cause damage to certain components. These limitations may be actual physical limitations or contractual limitations.

Accordingly, the model based control tuning process can check some or all ambient conditions to ensure that a limitation is not violated. For example, a gas turbine system or unit might over perform at the contract conditions but may have an issue exceeding the turbine exit Mach number on colder days. The tuning process can ensure that even though the contract conditions are met, at a different ambient condition, the gas turbine system or unit does not exceed a limit.

If the gas turbine system or unit is subpar and the actual output of the gas turbine system or unit, or the actual heat rate specified in the contract cannot be met, the contractual specified penalties should be minimized while still meeting the design and operational limitations. This objective may be represented as follows:

$$\text{Maximize Objective2} = \text{if}(O_d < 0, k_1, 0) * O_d(X_n, X_c, T) + \text{if}(H_d < 0, k_2, 0) * (H_d(X_n, X_c, T) \text{ subject to } y_1(X_n, X_c, T) \leq y_{1USL}; (X_n, X_c, T) \leq M_{xUSL}; T_{Rise}(X_n, X_c, T) \leq T_{RiseUSL}; T_{Exh}(X_n, X_c, T) \leq T_{ExhUSL} \text{ by changing } X_c = [T_f]\text{IGV}] \text{ where } T_f \leq T_{fUSL}, \text{IGV} \geq \text{IGV}_{LSL}(T)$$

Objective 2 can be subject to the same variables as Objective 1. Objective 2 is similar to Objective 1, except the contract conditions of output or heat rate cannot be achieved. Thus, maximizing Objective 2 can minimize any financial penalty as expressed by the weighting factors $k_1$ and $k_2$.

For example, a contract may specify different liquidated damages per megawatt shortage versus for a BTU fault. Similarly, a contract may provide different bonuses based on the two operating conditions. For example, some customers may not pay anything for extra output but may pay for exceeding heat rate requirement such as paying a bonus for every BTU that is saved. In this example, the factors $k_1$ and $k_2$ can be weighted away from megawatts and towards heat rate.

The model may be used to predict how that specific gas turbine system or unit may function at different ambient conditions and at different target firing levels and different IGV settings. As shown, a system and method using the example model described above may be used to reduce or minimize contract penalties and/or increase or maximize contractual bonuses.

Figure 4:
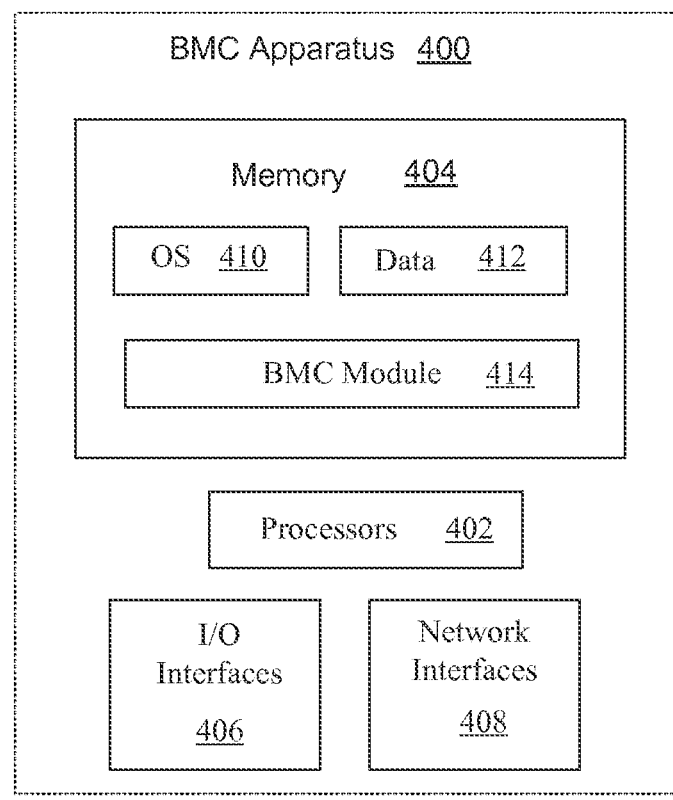
FIG. 4 illustrates a functional block diagram of model base control apparatus in accordance with an embodiment of the disclosure.

FIG. 4 illustrates a functional block diagram of an example model base control apparatus in accordance with an embodiment. The model base control apparatus 400 may comprise one or more processors 402, one or more memories 404, one or more input/output ("I/O") interfaces 406, and one or more network interfaces 408. The model base control apparatus 400 may include other devices not depicted.

The processor 402 may comprise one or more cores and is configured to access and execute at least in part instructions stored in the one or more memories 404. The one or more memories 404 comprise one or more computer-readable storage media ("CRSM"). The one or more memories 404 may include, but are not limited to, random access memory ("RAM"), flash RAM, magnetic media, optical media, and so forth. The one or more memories 404 may be volatile in that information is retained while providing power or non-volatile in that information is retained without providing power.

The one or more I/O interfaces 406 may also be provided in the model base control apparatus 400. These I/O interfaces 406 allow for coupling devices such as keyboards, mice, monitors, printers, external memories, and the like.

The one or more network interfaces 408 may provide for the transfer of data between the model base control apparatus 400 and another device directly such as in a peer-to-peer fashion, via a network, or both. The network interfaces 408 may include, but are not limited to, personal area networks ("PANs"), wired local area networks ("LANs"), wide area networks ("WANs"), wireless local area networks ("WLANs"), wireless wide area networks ("WWANs"), and so forth. The network interfaces 408 may utilize acoustic, radio frequency, optical, or other signals to exchange data between the model base control apparatus 400 and another device such as a smart phone, an access point, a host computer and the like.

The one or more memories 404 may store instructions or modules for execution by the processor 402 to perform certain actions or functions. The following modules are included by way of illustration, and not as a limitation. Furthermore, while the modules are depicted as stored in the memory 404, in some implementations, these modules may be stored at least in part in external memory which is accessible to the model base control apparatus 400 via the network interfaces 408 or the I/O interfaces 406. These modules may include an operating system module 410 configured to manage hardware resources such as the I/O interfaces 406 and provide various services to applications or modules executing on the processor 402.

A model base control module 414 may be stored in the memory 404. The module 414 may be configured to acquire inputted data from the one or more input devices. The model base control module 414 may be configured to obtain the operation limits and operation conditions. The module may be configured to obtain the field test data. Two sets of inputs for the process may be obtained. One set of inputs may be the non-controllable inputs which include the unit operation conditions, operation limits and unit characteristics (inlet pressure drop, exhaust pressure drop, compressor flow and efficiency, turbine efficiency and stage 1 nozzle flow coefficient, combustor efficiency, etc.). The other set may be controllable inputs, which include the control variables (IGV angle, $T_{fire}$, etc). The field data is correlated to a nominal unit. The module 414 may use thermodynamics based upon unit specific characteristics to run tuning processes for a set of ambient temperatures. The results from the tuning processes can be organized to update control schedules. The module 414 can allow running a plurality of limits instead of just one curve that has to represent or protect the engine against all of its limits. Accordingly, the BMC module can create a set of new control schedules based on gas turbine system or unit specific characteristics with respect to all of the boundary conditions/operation limits over a wide operation range of ambient conditions. The module 414 may store the data and the calculated schedules in the datastore 412.

The apparatus 400 described above with reference to FIG. 4 is provided by way of example only. As desired, numerous other embodiments, systems, methods, apparatus, and components may be utilized to create a set of control schedules based on gas turbine system or unit specific characteristics with respect to the boundary conditions/operation limits over a wide operation range of ambient temperatures.

Figure 5:
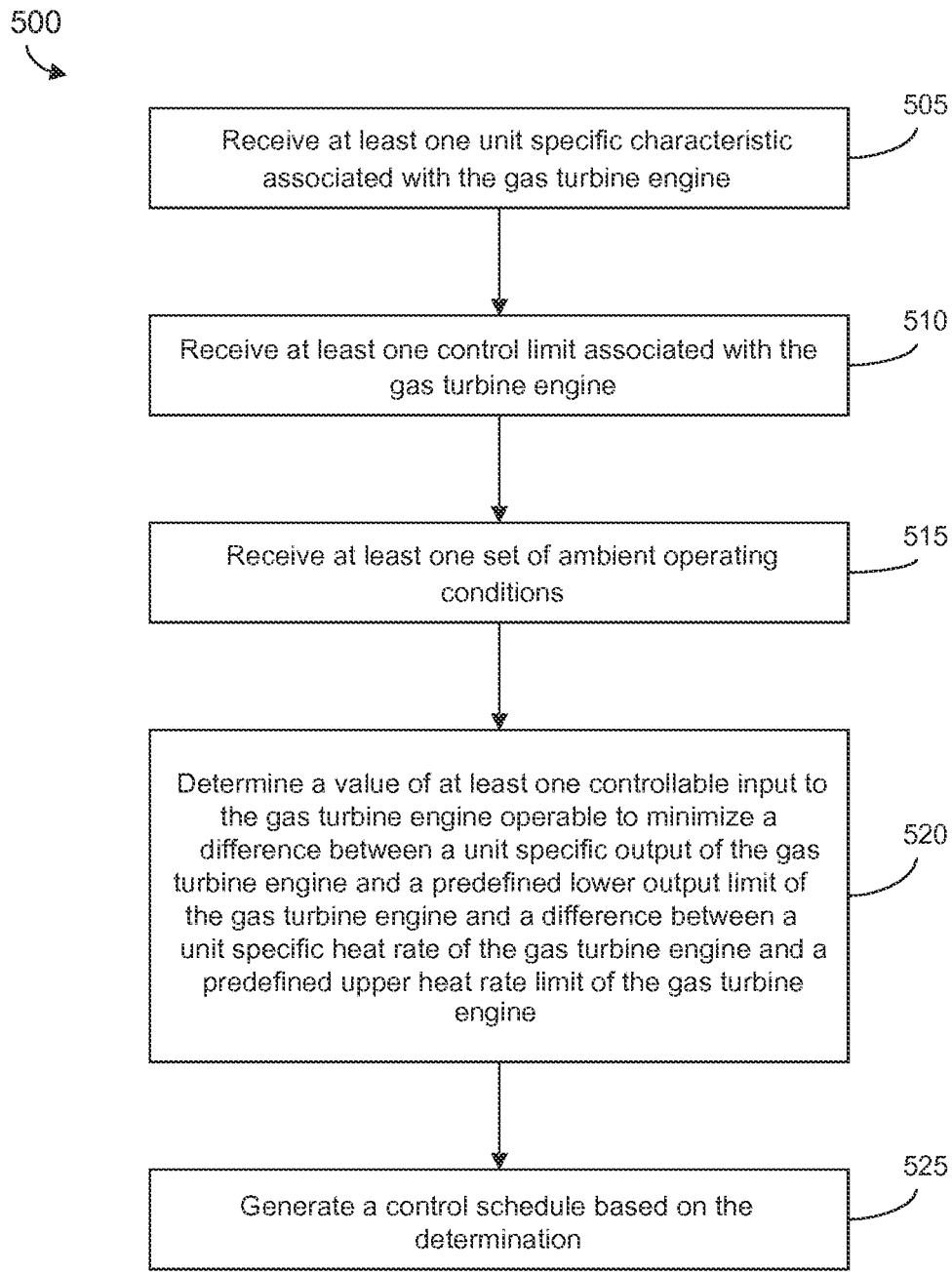
FIG. 5 illustrates a flow diagram for model based control tuning process of a gas turbine system in accordance with an embodiment of the disclosure.

FIG. 5 illustrates a flow diagram for a gas turbine system with model based control tuning process in accordance with an embodiment of the disclosure. In certain embodiments, the operations of the example method 500 may be performed by a model based control apparatus and/or one or more associated modules and/or applications such as the model based control module(s) as disclosed in FIG. 4. The method 500 may begin at block 505.

In block 505, the model can receive at least one unit specific characteristic associated with the gas turbine engine. Field test data may be collected and data reduction may be used to get unit specific characteristics. For example, the data matching step may compare data on the field test day on a 50 degree Fahrenheit (F) day and the model on a 50 degree Fahrenheit (F) day. Inherent differences in the actual built and a nominal unit can cause a delta. Gas turbine system or unit characteristics may include, but are not limited to, inlet pressure drop, exhaust pressure drop, compressor flow and efficiency, turbine efficiency and stage 1 nozzle flow coefficient, combustor efficiency, and the like. The actual gas turbine data may be reduced to data match a nominal model. After the data reduction, the outputs from the model can match the field data collected.

In block 510, the model can receive at least one control limit associated with the gas turbine engine. Limitations may exist on the amount of control the variables may produce. For example, the heat rate upper specification limit may be specified in the contract. Accordingly, temperature rise may have an upper specification limit. Additionally, there maybe other temperature limits. For example, excessive temperature may burn up or cause excessive wear on certain hot gas path components. This temperature limitation may represent a different upper specification limit. Likewise, exceeding the turbine exit axial mach limit may cause damage to certain components. These limitations may be actual physical limitations or contractual limitations.

In block 515, the model can receive at least one set of ambient operating conditions. Typically, at least at one set of ambient condition is specified at which the performance of an engine is to be measured. For the specified ambient conditions, a target output and heat rate may be specified. For example, at a specified ambient temperature, altitude, and relative humidity, an engine may be contractually obligated to meet a certain output and a certain heat rate.

In block 520, the model can determine a value of at least one controllable input to the gas turbine engine operable to minimize a difference between a unit specific output of the gas turbine engine and a predetermined lower output limit of the gas turbine engine and a difference between a unit specific heat rate of the gas turbine unit and a predefined upper heat rate limit of the gas turbine engine.

Adjustment may be needed to hit specified operational targets. A schedule is a set of controllable inputs, typically firing temperature and IGV angles that try to achieve the target. The control methodology may be based on the exhaust temperature as a function of compressor pressure ratio. The process can attempt to find the correct control schedules to minimize any difference from specified conditions. Adjusting the controllable variables may drive the gas turbine system or unit to meet specified targets.

In block 525, the model can generate a control schedule based upon the determination. The MBC tuning process can create a new set of control schedules to provide improved performance for a specific gas turbine unit over a wide operation range. Adjustment may be needed to reach specified operational targets. After the step of data match reductions, the operating schedules may be determined by using the tuning process based on the thermodynamic principles.

Certain aspects of the disclosure are described above with reference to block and flow diagrams of systems, methods, apparatus, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The disclosure claims:

1. A method for generating control schedules associated with a gas turbine, the method comprising:

receiving, via at least one processor, at least one gas turbine operation limit;

receiving, via the at least one processor, at least one gas turbine operation condition at a specific test point;

determining, via the at least one processor, gas turbine unit specific characteristics based at least in part on the at least one gas turbine operation condition, wherein the gas turbine unit specific characteristics comprise a compressor efficiency data match multiplier, a compressor flow data match multiplier, a combustor efficiency data match multiplier, a turbine efficiency data match multiplier, and a turbine flow coefficient data match multiplier;

based at least in part on the gas turbine unit specific characteristics and the at least one gas turbine operation limit, determining, via the at least one processor, one or more control parameters corresponding to one or more temperatures;

based at least in part on the one or more control parameters, generating, via the at least one processor, at least one control schedule or an update to an existing control schedule that predefines limits for a control system, based at least in part on the generated control schedule, creating a set of tuned control schedules with multiple nonlinear limits that work across an ambient range which has multiple control loops active across the ambient range with each control loop being active at a different ambient condition; and using the set of tuned control schedules in the control system to operate the gas turbine.

2. The method of claim 1, wherein the at least one gas turbine operation limit comprises at least one of an output upper limit, a turbine exit axial mach number limit, a combustor temperature rise limit, a firing temperature limit, a turbine exhaust temperature limit, a compressor discharge pressure limit, or a compressor discharge temperature limit.

3. The method of claim 1, wherein the at least one gas turbine operating condition comprises at least one of an ambient temperature, an ambient pressure, or an ambient humidity.

4. The method of claim 1, wherein the one or more control parameters comprise at least one of a combustor firing temperature or a compressor inlet guide vane angle.

5. The method of claim 1, wherein the control schedule comprises at least one of an exhaust temperature versus compressor inlet temperature schedule, a turbine exit axial mach number versus compressor inlet temperature schedule, a firing temperature vs. compressor inlet temperature schedule, or an inlet guide vane angle vs. compressor inlet temperature schedule.

6. The method of claim 1, wherein determining one or more control parameters corresponding to one or more temperatures comprises determining a value of at least one controllable input to the gas turbine engine operable to reduce a difference between a unit specific output of the gas turbine engine and a predefined lower output limit of the gas turbine engine and a difference between a unit specific heat rate of the gas turbine engine and a predefined upper heat rate limit of the gas turbine engine, wherein the unit specific output and the unit specific heat rate of the gas turbine engine are each functions of the at least one unit specific characteristic, the at least one control limit and the at least one set of ambient operating conditions.

7. The method of claim 6, wherein determining a value of at least one controllable input to the gas turbine engine operable to reduce a difference between a unit specific output of the gas turbine engine and a pre-defined lower output limit of the gas turbine engine and a difference between a unit specific heat rate of the gas turbine engine and a predefined upper heat rate limit of the gas turbine engine for each of the at least one set of ambient conditions comprises:

providing an output weighting factor and a heat rate weighting factor;

if the unit specific output is greater than or approximately equal to the predefined lower output limit and the pre-defined upper heat rate limit is greater than or approximately equal to the unit specific heat rate:
generating a weighted output value based on the output weighting factor and a difference between the unit specific output and the pre-defined lower output limit;
generating a weighted heat rate value based on the heat rate weighting factor and a difference between the pre-defined upper heat rate limit and the unit specific heat rate;
generating an aggregate penalty objective based on the weighted output value and the weighted heat rate value;
determining the value of the at least one controllable input that minimizes the aggregate penalty objective; and if the unit specific output is less than the pre-defined lower output limit or the pre-defined upper heat rate limit is less than the unit specific heat rate:
generating a weighted output value based on the output weighting factor and a difference between the unit specific output and the pre-defined lower output limit;
generating a weighted heat rate value based on the heat rate weighting factor and a difference between the pre-defined upper heat rate limit and the unit specific heat rate;
generating an aggregate penalty objective based on the weighted output value and the weighted heat rate value;

determining the value of the at least one controllable input that minimizes the aggregate penalty objective.

8. A system for generating control schedules associated with a gas turbine comprising:

a gas turbine; and at least one processor configured to:
receive at least one gas turbine operation limit;
receive at least one gas turbine operation condition at a specific test point;
determine gas turbine unit specific characteristics based at least in part on the at least one gas turbine operation condition, wherein the gas turbine unit specific characteristics comprise a compressor efficiency data match multiplier, a compressor flow data match multiplier, a combustor efficiency data match multiplier, a turbine efficiency data match multiplier, and a turbine flow coefficient data match multiplier;
based at least in part on the gas turbine unit specific characteristics and the at least one gas turbine operation limit, determine one or more control parameters corresponding to one or more temperatures;
based at least in part on the one or more control parameters, generate at least one control schedule or update an existing control schedule that predefines limits for a control system;
based at least in part on the generated control schedule, create a set of tuned control schedules with multiple nonlinear limits that work across an ambient range which has multiple control loops active across the ambient range with each control loop being active at a different ambient condition; and
using the set of tuned control schedules in the control system to operate the gas turbine.

9. The system of claim 8, wherein the at least one gas turbine operation limit comprises at least one of an output upper limit, a turbine exit axial mach number limit, a combustor temperature rise limit, a firing temperature limit, a turbine exhaust temperature limit, a compressor discharge pressure limit, or a compressor discharge temperature limit.

10. The system of claim 8, wherein the at least one gas turbine operating condition comprises at least one of an ambient temperature, an ambient pressure, or an ambient humidity.

11. The system of claim 8, wherein the one or more control parameters comprise at least one of a combustor firing temperature or a compressor inlet guide vane angle.

12. The system of claim 8, wherein the control schedule comprises at least one of an exhaust temperature vs. compressor inlet temperature schedule, a turbine exit axial mach number vs. compressor inlet temperature schedule, a firing temperature vs. compressor inlet temperature schedule, or an inlet guide vane angle vs. compressor inlet temperature schedule.

13. The system of claim 8, wherein determining one or more control parameters corresponding to one or more temperatures comprises determining a value of at least one controllable input to the gas turbine engine operable to minimize a difference between a unit specific output of the gas turbine engine and a predefined lower output limit of the gas turbine engine and a difference between a unit specific heat rate of the gas turbine engine and a predefined upper heat rate limit of the gas turbine engine, wherein the unit specific output and the unit specific heat rate of the gas turbine engine are each functions of the at least one unit specific characteristic, the at least one control limit and the at least one set of ambient operating conditions.

14. The system of claim 13, wherein determining a value of at least one controllable input to the gas turbine engine operable to minimize a difference between a unit specific output of the gas turbine engine and a pre-defined lower output limit of the gas turbine engine and a difference between a unit specific heat rate of the gas turbine engine and a predefined upper heat rate limit of the gas turbine engine for each of the at least one set of ambient conditions comprises:
   providing an output weighting factor and a heat rate weighting factor;
   if the unit specific output is greater than or approximately equal to the predefined lower output limit and the predefined upper heat rate limit is greater than or approximately equal to the unit specific heat rate:
      generating a weighted output value based on the output weighting factor and a difference between the unit specific output and the pre-defined lower output limit;
      generating a weighted heat rate value based on the heat rate weighting factor and a difference between the pre-defined upper heat rate limit and the unit specific heat rate;
      generating an aggregate penalty objective based on the weighted output value and the weighted heat rate value;
      determining the value of the at least one controllable input that minimizes the aggregate penalty objective; and
   if the unit specific output is less than the pre-defined lower output limit or the pre-defined upper heat rate limit is less than the unit specific heat rate:
      generating a weighted output value based on the output weighting factor and a difference between the unit specific output and the pre-defined lower output limit;
      generating a weighted heat rate value based on the heat rate weighting factor and a difference between the pre-defined upper heat rate limit and the unit specific heat rate;
      generating an aggregate penalty objective based on the weighted output value and the weighted heat rate value;
      determining the value of the at least one controllable input that minimizes the aggregate penalty objective.

15. One or more non transitory computer-readable media storing computer executable instructions that, when executed by at least one processor, configure the at least one processor to:
   receive unit specific characteristic associated with the gas turbine engine, wherein the gas turbine unit specific characteristics comprise a compressor efficiency data match multiplier, a compressor flow data match multiplier, a combustor efficiency data match multiplier, a turbine efficiency data match multiplier, and a turbine flow coefficient data match multiplier;
   receive at least one control limit associated with the gas turbine engine;
   receive at least one set of ambient operating conditions at a specific test point;
   determine a value of at least one controllable input to the gas turbine engine operable to minimize a difference between a unit specific output of the gas turbine engine and a predefined lower output limit of the gas turbine engine and a difference between a unit specific heat rate of the gas turbine engine and a predefined upper heat rate limit of the gas turbine engine, wherein the unit specific output and the unit specific heat rate of the gas turbine engine are each functions of the at least one unit specific characteristic, the at least one control limit and the at least one set of ambient operating conditions;
   generate a control schedule based on the determination that predefines limits for a control system;
   based at least in part on the generated control schedule, create a set of tuned control schedules with multiple nonlinear limits that work across an ambient range which has multiple control loops active across the ambient range with each control loop being active at a different ambient condition; and
   using the at least one control schedule in the control system to operate the gas turbine.

16. One or more non transitory computer-readable media of claim 15, wherein the one or more gas turbine unit specific characteristics comprise at least one of a data match multiplier, a compressor efficiency data match multiplier, a compressor flow data match multiplier, a combustor efficiency data match multiplier, a turbine efficiency data match multiplier, or a turbine flow coefficient data match multiplier.

17. One or more non transitory computer-readable media of claim 15, wherein the at least one gas turbine operation limit comprises at least one of an output upper limit, a turbine exit axial mach number, a combustor temperature rise limit, a firing temperature limit, a turbine exhaust temperature limit, a compressor discharge pressure limit, or a compressor discharge temperature limit.

18. One or more non transitory computer-readable media of claim 15, wherein the control schedule comprises at least one of an exhaust temperature versus compressor inlet temperature schedule, a turbine exit axial mach number vs. compressor inlet temperature schedule, a firing temperature versus compressor inlet temperature schedule, or an inlet guide vane angle vs. compressor inlet temperature schedule.

* * * * *